(12) United States Patent
Liang et al.

(10) Patent No.: US 12,316,794 B2
(45) Date of Patent: May 27, 2025

(54) ELECTRONIC DEVICE

(71) Applicant: VIVO MOBILE COMMUNICATION CO., LTD., Guangdong (CN)

(72) Inventors: Yuanbiao Liang, Guangdong (CN); Ye Wang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 400 days.

(21) Appl. No.: 17/942,418

(22) Filed: Sep. 12, 2022

(65) Prior Publication Data

US 2023/0007109 A1 Jan. 5, 2023

Related U.S. Application Data

(63) Continuation of application No. PCT/CN2021/076999, filed on Feb. 20, 2021.

(30) Foreign Application Priority Data

Mar. 27, 2020 (CN) .......................... 202010234120.3

(51) Int. Cl.
*H04M 1/02* (2006.01)
(52) U.S. Cl.
CPC .................................. *H04M 1/026* (2013.01)
(58) Field of Classification Search
CPC .... H04M 1/026; H04M 1/0264; H04M 1/035; H04M 1/0277; H04R 1/20; H04R 2499/11; H05K 5/061
See application file for complete search history.

(56) References Cited

U.S. PATENT DOCUMENTS

| 8,385,060 | B2* | 2/2013 | Dabov | G06F 1/169 |
| | | | | 361/679.55 |
| 11,399,085 | B2* | 7/2022 | Jung | H04M 1/0264 |
| 11,641,415 | B2* | 5/2023 | Jung | H04M 1/0264 |
| | | | | 455/556.1 |

(Continued)

FOREIGN PATENT DOCUMENTS

| CN | 103259888 A | 8/2013 |
| CN | 106657485 A | 5/2017 |

(Continued)

OTHER PUBLICATIONS

First Office Action for Chinese Application No. 202010234120.3, dated Oct. 27, 2020, 8 pages.

(Continued)

*Primary Examiner* — Jinsong Hu
*Assistant Examiner* — Rui M Hu
(74) *Attorney, Agent, or Firm* — BROOKS KUSHMAN P.C.

(57) ABSTRACT

An electronic device, including a housing, a first functional module, a second functional module, and a third functional module. The third functional module is disposed in the housing, the third functional module includes an acoustic component, a sound guide channel is disposed in the housing, the second functional module and the first functional module are mounted on the housing, with an assembly gap present between the second functional module and the first functional module, and the acoustic component communicates with the assembly gap through the sound guide channel.

20 Claims, 3 Drawing Sheets

(56) References Cited

U.S. PATENT DOCUMENTS

| | | | |
|---|---|---|---|
| 11,943,378 B2* | 3/2024 | Jung | H04N 23/57 |
| 2005/0179813 A1* | 8/2005 | Fujii | H04N 23/51 |
| | | | 348/E5.026 |
| 2007/0123312 A1* | 5/2007 | Friedman | H04M 1/6041 |
| | | | 379/433.02 |
| 2008/0176609 A1* | 7/2008 | Kim | H04M 1/035 |
| | | | 455/575.1 |
| 2011/0223975 A1 | 9/2011 | Matsushima et al. | |
| 2013/0217444 A1 | 8/2013 | Lee et al. | |
| 2015/0219608 A1* | 8/2015 | Choi | G01N 33/0009 |
| | | | 73/23.2 |
| 2016/0014488 A1* | 1/2016 | Iwaya | H04R 1/021 |
| | | | 381/91 |
| 2017/0251564 A1* | 8/2017 | Jun | H05K 5/069 |
| 2019/0037293 A1* | 1/2019 | Kim | H04M 1/026 |
| 2019/0297429 A1* | 9/2019 | Zuo | H04R 19/04 |
| 2019/0320050 A1* | 10/2019 | Lim | H04R 1/326 |
| 2019/0394316 A1 | 12/2019 | Zhang | |
| 2020/0173644 A1 | 6/2020 | Yamamoto et al. | |
| 2021/0037125 A1* | 2/2021 | Jung | G03B 31/00 |
| 2021/0058692 A1* | 2/2021 | Shankar | G06F 3/014 |
| 2022/0053251 A1 | 2/2022 | Ding et al. | |
| 2022/0150610 A1* | 5/2022 | Kim | H04R 1/345 |
| 2022/0286539 A1* | 9/2022 | Stobbe | H04M 1/035 |

FOREIGN PATENT DOCUMENTS

| | | |
|---|---|---|
| CN | 206629355 U | 11/2017 |
| CN | 108429831 A | 8/2018 |
| CN | 110035341 A | 7/2019 |
| CN | 110087167 A | 8/2019 |
| CN | 209448766 U | 9/2019 |
| CN | 110913048 A | 3/2020 |
| CN | 111405098 A | 7/2020 |
| JP | 2011193183 A | 9/2011 |
| JP | 201954410 A | 4/2019 |
| WO | 2014157499 A1 | 10/2014 |
| WO | WO2019013216 A1 | 2/2020 |

OTHER PUBLICATIONS

Second Office Action for Chinese Application No. 202010234120.3, dated May 12, 2021, 7 pages.

International Search Report and Written Opinion for Application No. PCT/CN2021/076999, dated May 19, 2021, 8 pages.

Extended European Search Report for Application No. 21775326.8, dated Aug. 24, 2023, 11 Pages.

First Office Action for Japanese Application No. 2022-559291, dated Oct. 27, 2023, 4 Pages.

* cited by examiner

ELECTRONIC DEVICE

CROSS-REFERENCE TO RELATED APPLICATIONS

This application is a continuation application of PCT International Application No. PCT/CN2021/076999 filed on Feb. 20, 2021, which claims priority to Chinese Patent Application No. 202010234120.3, filed on Mar. 27, 2020, which are incorporated herein by reference in their entireties.

TECHNICAL FIELD

The present invention relates to the field of communications technologies, and in particular, to an electronic device.

BACKGROUND

Electronic devices such as smartphones and tablet computers have become indispensable products in modern life. Acoustic components, such as a phone receiver, a microphone, and a speaker, are generally disposed in an electronic device, and the acoustic components can implement acoustic performance of the electronic device.

In the related art, acoustic components are disposed in a housing of an electronic device, and the housing of the electronic device is provided with a sound guide hole. Sound information sent out by a user can be transmitted to the acoustic component through the sound guide hole, or sound information sent out by the acoustic component is transmitted to the user through an opening, so as to implement sound information exchange between the user and the electronic device.

However, in the foregoing solution, the housing needs to be provided with the sound guide hole for transmitting sound information. In this case, the sound guide hole damages integrity of the housing, affecting appearance consistency of the electronic device. The sound guide hole also reduces waterproof and dustproof performance of the electronic device, leading to poor safety and reliability of the electronic device.

SUMMARY

The present invention discloses an electronic device, to resolve problems of low appearance consistency and poor safety and reliability of the electronic device.

To resolve the foregoing technical problems, the present invention is implemented as follows:

According to a first aspect, an embodiment of the present invention discloses an electronic device, including a housing, a first functional module, a second functional module, and a third functional module, where the third functional module is disposed in the housing, the third functional module includes an acoustic component, a sound guide channel is disposed in the housing, the second functional module and the first functional module are mounted on the housing, with an assembly gap present between the second functional module and the first functional module, and the acoustic component communicates with the assembly gap through the sound guide channel.

The technical solution used in the present invention can achieve the following beneficial effects:

In this embodiment of the present invention, the second functional module and the first functional module are mounted on the housing, with an assembly gap present between the second functional module and the first functional module, and the acoustic component communicates with the assembly gap through the sound guide channel. When a user sends out sound information, the sound information enters the housing through the assembly gap, and the assembly gap transmits the sound information to the acoustic component through the sound guide channel; or when the acoustic component sends out sound information, the sound information is transmitted to the assembly gap through the sound guide channel, and then transmitted to the user through the assembly gap, thereby implementing sound information exchange between the user and the electronic device. In this solution, an assembly gap is present after the first functional module and the second functional module are fitted together. Therefore, the assembly gap between the first functional module and the second functional module can be used to transmit sound information, so that no sound guide hole needs to be provided on the housing. This reduces openings on the housing, and improves integrity and appearance consistency of the housing, thereby guaranteeing a good appearance and texture of the housing and improving user experience. In addition, the assembly gap is narrower than the sound guide hole, which can effectively prevent ambient vapor and dust from entering the housing, thereby improving waterproof and dustproof performance of the electronic device.

BRIEF DESCRIPTION OF DRAWINGS

To describe the technical solutions in the embodiments of the present invention or in the background more clearly, the following briefly describes the accompanying drawings required for describing the embodiments or the background. Apparently, a person of ordinary skill in the art may still derive other drawings from these accompanying drawings without creative efforts.

Reference signs are described as follows:

100. housing,

210. first functional module,

220. second functional module, 221. assembly gap, 222. connection channel,

230. acoustic component,

400. sound guide channel, 410. first sound guide segment, 420. second sound guide segment, 430. third sound guide segment,

510. main board bracket, 511. second groove, 520. cover plate, 521. first through hole, 530. circuit board, 531. second through hole, and

610. first sealing member, 611. first bypass hole, 620. second sealing member, 621. second bypass hole, and 630. dustproof portion.

DETAILED DESCRIPTION

To make the objectives, technical solutions, and advantages of the present invention clearer, the following clearly describes the technical solutions of the present invention with reference to specific embodiments of the present invention and corresponding drawings. Apparently, the described embodiments are merely some rather than all of the embodiments of the present invention. Based on the embodiments of the present invention, all other embodiments obtained by a person of ordinary skill in the art without creative efforts shall fall within the protection scope of the present invention.

The technical solutions disclosed in the embodiments of the present invention are described in detail below with reference to the accompanying drawings.

Figure 1:
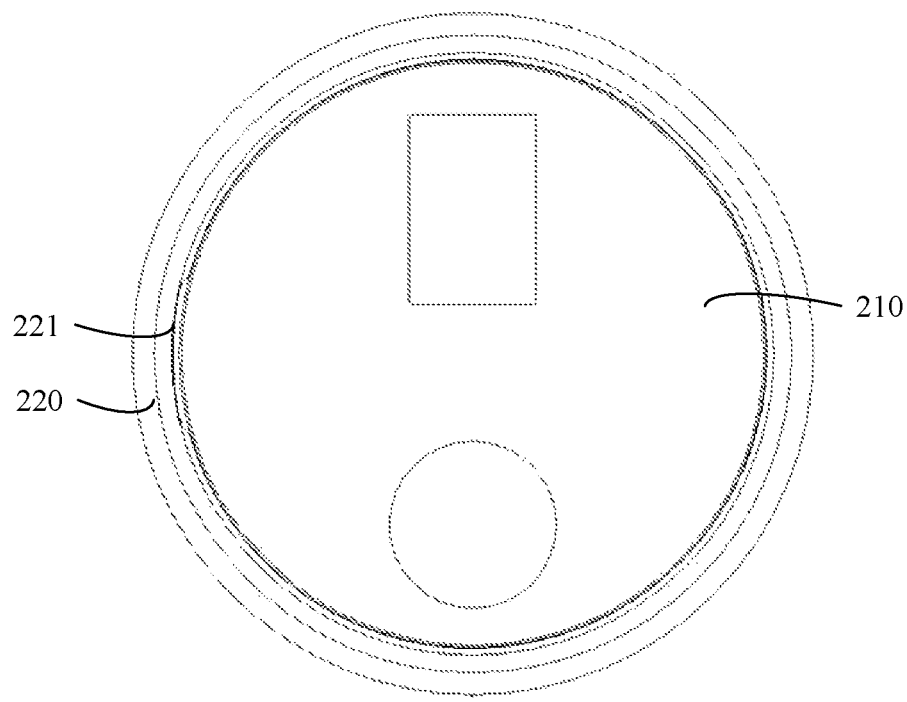
FIG. 1 is a partial schematic structural diagram of an electronic device disclosed in an embodiment of the present invention.
Figure 2:
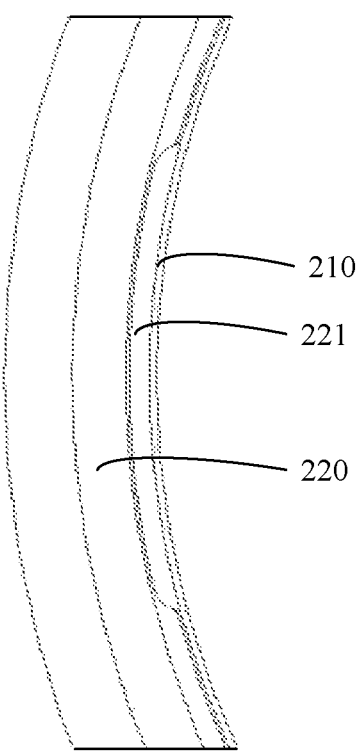
FIG. 2 is a partially enlarged view of FIG. 1.
Figure 3:
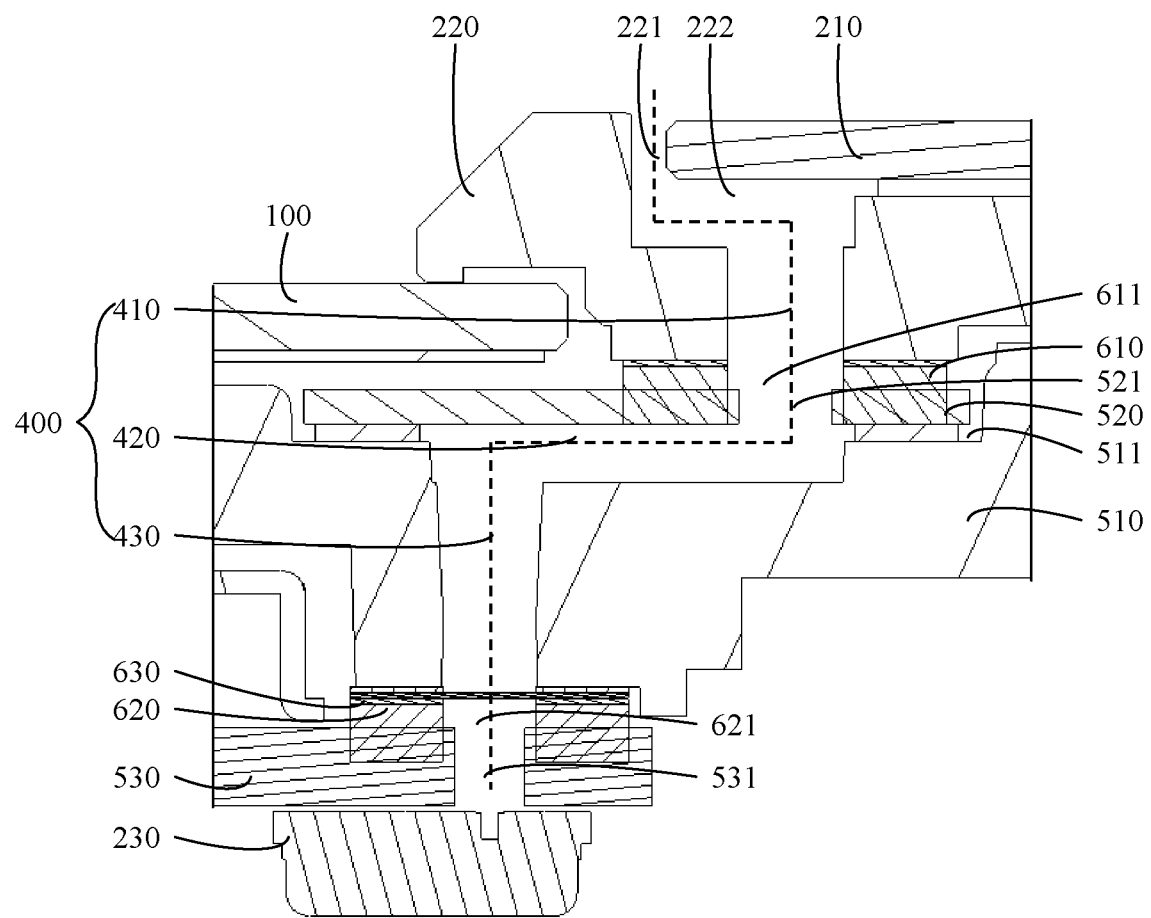
FIG. 3 is a sectional view of an electronic device disclosed in an embodiment of the present invention.

As shown in FIG. 1 to FIG. 3, an embodiment of the present invention discloses an electronic device, and the electronic device includes a housing 100, a first functional module 210, a second functional module 220, and a third functional module.

The housing 100 provides a foundation for mounting other components of the electronic device. The third functional module may be disposed in the housing 100. The third functional module includes an acoustic component 230, and the acoustic component 230 may include at least one of sounding components or sound pickup components such as a microphone, a phone receiver, and a speaker. A sound guide channel 400 is disposed in the housing 100, and the sound guide channel 400 is configured to transmit sound information. The second functional module 220 and the first functional module 210 are mounted on the housing 100, and an assembly gap 221 is present between the second functional module 220 and the first functional module 210, with an opening of the assembly gap 221 being exposed out of an outer surface of the electronic device. The assembly gap 221 may be configured to guide sound for the electronic device, and the acoustic component 230 communicates with the assembly gap 221 through the sound guide channel 400.

In a specific operation process, in a case that the acoustic component 230 is a sound pickup component, when a user sends out sound, the sound enters the housing 100 through the assembly gap 221, and the assembly gap 221 transmits the sound to the acoustic component 230 through the sound guide channel 400. In this embodiment, the acoustic component 230 may be a microphone. In a case that the acoustic component 230 is a sounding component, when the acoustic component 230 sends out sound, the sound is transmitted to the assembly gap 221 through the sound guide channel 400, and then transmitted to the user through the assembly gap 221. In this embodiment, the acoustic component 230 may be a phone receiver or a speaker.

Optionally, the housing 100 may include a front cover and a rear cover, where the front cover may provide a foundation for mounting a display screen of the electronic device, and the rear cover may be a battery cover of the electronic device. In a case that both the first functional module 210 and the second functional module 220 are mounted on the rear cover of the housing 100, the first functional module 210 may be a rear-facing camera module of the electronic device, a flash lamp module, a fingerprint module, a second display module disposed on the rear cover of the housing, or the like. To better describe this embodiment, the following assumes that the first functional module 210 is a rear-facing camera module. The second functional module 220 may be a decorative part of the first functional module 210, and therefore the assembly gap 221 is present between the rear-facing camera module, the flash lamp module, or the fingerprint module disposed on the rear and their corresponding decorative rings. Certainly, the first functional module 210 and the second functional module 220 may alternatively be other functional modules, which are not limited herein.

In this embodiment of the present invention, the assembly gap 221 is present after the first functional module 210 and the second functional module 220 are fitted together. Therefore, the assembly gap 221 between the first functional module 210 and the second functional module 220 can be used to transmit sound information, so that no sound guide hole needs to be provided on the housing 100. This reduces openings on the housing 100, and improves integrity and appearance consistency of the housing 100, thereby guaranteeing a good appearance and texture of the housing and improving user experience. In addition, the assembly gap 221 is narrower than the sound guide hole, which can effectively prevent ambient vapor and dust from entering the housing 100, thereby improving waterproof and dustproof performance of the electronic device.

Moreover, the assembly gap 221 between the first functional module 210 and the second functional module 220 is used to transmit sound information, so that the housing 100 does not need an additionally processed sound guide hole. This optimizes a processing process of the housing 100 and simplifies processing steps of the housing 100, thereby reducing manufacturing costs of the electronic device.

In an optional embodiment, the assembly gap 221 may be in an elongated strip shape. A width of the assembly gap 221 can be reduced to make the assembly gap 221 more concealed. The width is a distance between parts of the first functional module 210 and the second functional module 220 which form the assembly gap 221. In this case, the assembly gap 221 is not easy to be seen, guaranteeing a good appearance and texture of the electronic device. An extension direction of the assembly gap 221 is a length direction of the assembly gap 221. In this case, a length of the assembly gap 221 can be increased to increase an area of the assembly gap 221, so as to satisfy a sound guide requirement of the acoustic component 230. A shape and structure of the assembly gap 221 may be determined by shapes and structures of the first functional module 210 and the second functional module 220.

In another embodiment, the assembly gap 221 may be of an arc structure. The arc structure has no corners and is much smoother than a linear structure, making the electronic device more aesthetic and further improving user experience.

To further improve performance of the acoustic component 230, in an optional embodiment, an opening is provided on an edge of a side of the second functional module 220 attached to the first functional module 210, and the opening forms the assembly gap 221. In this solution, part of material is removed from the edge of the side of the second functional module 220 attached to the first functional module 210, so that the assembly gap 221 between the second functional module 220 and the first functional module 210 is larger, and the area of the assembly gap 221 is increased. In this way, the assembly gap 221 can transmit more sound information, which improves the performance of the acoustic component 230, allowing for better sound quality of the electronic device. Optionally, the opening may be in an elongated strip shape, or may certainly be in other shapes, which is not limited herein. Certainly, an opening may alternatively be provided on an edge of a side of the first functional module 210 attached to the second functional module 220, which can achieve the same technical effects: larger area of the assembly gap 221 allows the assembly gap 221 to transmit more sound information, thereby improving the performance of the acoustic component 230 and allowing for better sound quality of the electronic device.

In an optional embodiment, the first functional module 210 may include a first functional component and a module bracket. The first functional component is mounted on the module bracket, the first functional component and the module bracket are exposed out of an outer surface of the housing 100, and the assembly gap 221 is formed between the module bracket and the second functional module 220. In this solution, sound cannot easily affect the first functional component when being transmitted, and ambient vapor and dust cannot easily enter the first functional component, thereby improving reliability of the electronic device.

For example, when the first functional module 210 is a camera module, the first functional component may include a camera and other electronic components, and the module bracket provides a foundation for mounting the camera and other electronic components.

In the foregoing embodiment, ambient dust and vapor can enter the housing 100 along the assembly gap 221, which may cause the sound guide hole of the acoustic component 230 to be blocked or electronic components of the acoustic component 230 to be short-circuited, resulting in damage to the acoustic component 230 and low safety and reliability of the electronic device. To resolve the foregoing problems, in an optional embodiment, the sound guide channel 400 may include a first sound guide segment 410, a second sound guide segment 420, and a third sound guide segment 430 that are in sequential communication, where the first sound guide segment 410 communicates with the assembly gap 221, the acoustic component 230 is located on an end of the third sound guide segment 430 facing away from the second sound guide segment 420, a central axis of the first sound guide segment 410 intersects with a central axis of the second sound guide segment 420, and the central axis of the first sound guide segment 410 is parallel to a central axis of the third sound guide segment 430. In this solution, the sound guide channel 400 is of a bending structure, so that a side wall of each sound guide segment can stop dust and vapor. In addition, a long sound guide channel 400 allows most of the dust and vapor to settle on the side wall of each sound guide segment, so that the dust and vapor cannot easily reach a mounting position of the acoustic component 230, and the sound guide hole of the acoustic component 230 is not easily blocked, allowing for good sound quality of the acoustic component 230.

Optionally, an included angle between the central axis of the first sound guide segment 410 and the central axis of the second sound guide segment 420 may be 90°. In this case, the central axis of the first sound guide segment 410 may be perpendicular to the central axis of the second sound guide segment 420. In this case, the sound guide channel 400 has a compact structure, so that the sound guide channel 400 occupies a small space of the housing 100. Certainly, the included angle between the central axis of the first sound guide segment 410 and the central axis of the second sound guide segment 420 may alternatively be other angles, such as 30°, 45°, or 60°. A specific included angle is not limited in the present invention.

In the foregoing solution, the central axis of the first sound guide segment 410 may intersect with the central axis of the second sound guide segment 420, and the central axis of the first sound guide segment 410 may be parallel to the central axis of the third sound guide segment 430. In this case, the second sound guide segment 420 may guide the third sound guide segment 430 to an edge position of the housing 100, so that the acoustic component 230 is closer to the edge position of the housing 100, thereby optimizing a structure of the electronic device.

In another optional embodiment, a connection channel 222 may be formed between the first functional module 210 and the second functional module 220, the first sound guide segment 410 and the assembly gap 221 are staggered, and the first sound guide segment 410 communicates with the assembly gap 221 through the connection channel 222. In this case, the assembly gap 221, the connection channel 222, and the first sound guide segment 410 form a bending structure, and a side wall of the bending structure can stop the dust and vapor. Therefore, most of the dust and vapor can be attached to the side wall of the bending structure, which can prevent the dust and vapor from entering the acoustic component 230, so that the sound guide hole of the acoustic component 230 is not easily blocked and the electronic components of the acoustic component 230 are not easily short-circuited or damaged, further improving safety and reliability of the electronic device.

Optionally, when the first functional module 210 includes the first functional component and the module bracket, the connection channel 222 is formed by the module bracket and part of the second functional module 220 not exposed out of a surface of the housing 100.

In the foregoing embodiment, the electronic device disclosed in the embodiments of the present invention may further include a main board bracket 510, where the main board bracket 510 is configured for mounting an electronic component of the electronic device, the main board bracket 510 is disposed in the housing 100, the first sound guide segment 410 may be provided on the first functional module 210, the second sound guide segment 420 and the third sound guide segment 430 may be provided on the main board bracket 510, and the first sound guide segment 410 forms an included angle with the second sound guide segment 420 and the third sound guide segment 430. When the second sound guide segment 420 is formed by pouring, the second sound guide segment 420 is located in the inside of the main board bracket 510, and the main board bracket 510 is difficult to demould, resulting in difficult processing and high costs of the electronic device.

In an optional embodiment, the electronic device disclosed in the embodiments of the present invention further includes a cover plate 520, where the cover plate 520 may be located in the housing 100, a first groove may be provided on a side of the main board bracket 510 facing toward the first functional module 210, the cover plate 520 covers a notch of the first groove, and in this case, the cover plate 520 and the first groove can form the second sound guide segment 420. One end of the cover plate 520 may be provided with a first through hole 521, and the second sound guide segment 420 may communicate with the first sound guide segment 410 through the first through hole 521. The third sound guide segment 430 may be provided on a bottom wall of the first groove, and the first through hole 521 and the third sound guide segment 430 are staggered. The first groove may be formed on the main board bracket 510 by pouring. Because the first groove is of an open structure, the main board bracket 510 is easy to demould. Then the cover plate 520 covers the notch of the first groove to form the second sound guide segment 420. This solution allows the second sound guide segment 420 to be easily processed, thereby reducing processing difficulty and costs of the electronic device.

Optionally, the cover plate 520 may be bonded to the main board bracket 510 by using a double-sided adhesive tape. The cover plate 520 may be a PET (Polyethylene terephthalate) plate or a metal plate. When the cover plate 520 is a metal plate, the cover plate 520 reinforces the main board bracket 510, enhancing overall rigidity of the main board bracket 510.

In the foregoing embodiment, the first sound guide segment 410 may be disposed on the first functional module 210, and the second sound guide segment 420 may be disposed on the main board bracket 510. In this case, a gap is present between the first sound guide segment 410 and the second sound guide segment 420, and sound can enter the gap, leading to sound leakage of the electronic device and seriously affecting sound quality of the electronic device. In an optional embodiment, the electronic device disclosed in the embodiments of the present invention may further include a first sealing member 610, where the first functional module 210 is sealedly connected to the cover plate 520 through the first sealing member 610, a first bypass hole 611 is provided on a part of the first sealing member 610 opposite the first through hole 521, and the first sound guide segment 410 and the second sound guide segment 420 communicate with the first through hole 521 through the first bypass hole 611. In this case, the first sealing member 610 can plug the gap between the first sound guide segment 410 and the second sound guide segment 420 to prevent the sound leakage of the electronic device, allowing for good sound quality of the electronic device. In addition, the first sealing member 610 can block dust and vapor in the sound guide channel 400, thereby preventing the dust and vapor from damaging the electronic component of the electronic device. Optionally, the first sealing member 610 may be made of a material such as silicone or rubber.

In the foregoing embodiment, the cover plate 520 overlaps on a plate surface of the main board bracket 510, such that the main board bracket 510 and the cover plate 520 are stacked high. Such a stacking structure of the main board bracket 510 and the cover plate 520 occupies much space of the housing 100, making the electronic device thicker and affecting user experience. In an optional embodiment, a second groove 511 may be further provided on the side of the main board bracket 510 facing toward the first functional module 210. The first groove may be provided at the bottom of the second groove 511, the notch of the first groove is located at the bottom of the second groove 511, the cover plate 520 overlaps on the bottom of the second groove 511, the first groove and the second groove 511 may form a sinking platform structure, and at least part of the cover plate 520 is located in the second groove 511. In this solution, at least part of the cover plate 520 can be hidden in the second groove 511, so that the volume of the cover plate 520 exposed is reduced. Therefore, a stacking height of the main board bracket 510 and the cover plate 520 is small, and the stacking structure of the main board bracket 510 and the cover plate 520 occupies only a small space of the housing 100, allowing the electronic device to be thin.

In another embodiment, the electronic device disclosed in the embodiments of the present invention may further include a circuit board 530, and the circuit board 530 is configured for mounting the electronic component of the electronic device. The circuit board 530 may be disposed on a side of the main board bracket 510 facing away from the first functional module 210, the circuit board 530 may be provided with a second through hole 531, the acoustic component 230 may be disposed on a side of the circuit board 530 facing away from the main board bracket 510, and the acoustic component 230 communicates with the third sound guide segment 430 through the second through hole 531. In this solution, the acoustic component 230 may be disposed on the side of the circuit board 530 facing away from the main board bracket 510, so that the acoustic component 230 does not interfere with the main board bracket 510, thereby improving reliability of the electronic device.

Optionally, the circuit board 530 may be a main board of the electronic device or a secondary board of the electronic device. In this embodiment of the present invention, the circuit board 530 may be a rigid printed circuit board or a flexible printed circuit board. For example, the circuit board 530 may be a printed circuit board or a rigid-flex printed circuit board, or the circuit board 530 includes a flexible printed circuit board and a reinforcing board that are attached to each other. Certainly, other structures and forms may also be used, which are not limited herein.

To prevent sound leakage at a junction between the second through hole 531 and the third sound guide segment 430, optionally, the electronic device disclosed in the embodiments of the present invention may further include a second sealing member 620. The circuit board 530 may be sealedly connected to the main board bracket 510 through the second sealing member 620, a second bypass hole 621 may be provided on a part of the second sealing member 620 opposite the second through hole 531, and the third sound guide segment 430 communicates with the second through hole 531 through the second bypass hole 621. In this solution, the second sealing member 620 can plug a gap between the third sound guide segment 430 and the second through hole 531 to prevent sound leakage of the electronic device, thereby further improving the sound quality of the electronic device. Optionally, the second sealing member 620 may be made of a material such as silicone or rubber.

In another embodiment, a third groove may also be provided on the side of the main board bracket 510 facing away from the first functional module 210, and the second sealing member 620 is disposed in the third groove. In this case, the second sealing member 620 can be hidden in the third groove, so that volume of the second sealing member 620 exposed is reduced, reducing a stacking height of a structure formed by the main board bracket 510, the second sealing member 620, and the circuit board 530. The structure formed by the main board bracket 510, the second sealing member 620, and the circuit board 530 occupies only a small space of the housing 100, allowing the electronic device to be thin.

In an optional embodiment, the electronic device disclosed in the embodiments of the present invention may further include a dustproof portion 630, and the dustproof portion 630 may be disposed between the third sound guide segment 430 and the second through hole 531. In this case, the dustproof portion 630 can block most of the dust in the third sound guide segment 430, so that the dust cannot easily enter the second through hole 531. Only a small amount of dust in the second through hole 531 will not affect the sound quality of the acoustic component 230. In addition, the dustproof portion 630 may be sandwiched between the main board bracket 510 and the circuit board 530, so that the main board bracket 510 does not need to be provided with a part for mounting the dustproof portion 630, allowing the dustproof portion 630 to be mounted easily.

In an optional embodiment, the first functional module 210 may be of a disc structure, the second functional module 220 may be of a ring structure, the second functional module 220 may be disposed around the first functional module 210, the assembly gap 221 may be of an annular structure, and part of the assembly gap 221 communicates with the sound guide channel 400. In this solution, the assembly gap 221 may be of a smooth annular structure without any corners, making the electronic device more aesthetic and further improving user experience.

In another embodiment, the assembly gap 221 communicates with the sound guide channel 400. In this case, the annular assembly gap 221 can collect sound or produce sound for the electronic device, thereby implementing a stereo effect of the electronic device. In addition, the large area of the assembly gap 221 allows for good sound quality of the electronic device.

The electronic device disclosed in the embodiments of the present invention may be a device such as a smart phone, a tablet computer, an e-book reader, a wearable device (such as a smartwatch), or an electronic game console. The embodiments of the present invention do not limit the specific type of the electronic device.

The foregoing embodiments of the present invention focus on the differences between the embodiments. As long as different features of improvement in the embodiments are not contradictory, they can be combined to form a more preferred embodiment. Further descriptions are omitted herein for the purpose of brevity.

The foregoing descriptions are merely embodiments of the present invention and are not intended to limit the present invention. For a person skilled in the art, the present invention may have various changes and variations. Any modification, equivalent replacement, or improvement made without departing from the spirit and principle of the present invention shall fall within the scope of the claims of the present invention.

What is claimed is:

1. An electronic device, comprising a housing, a first functional module, a second functional module, and a third functional module, wherein the third functional module is disposed in the housing, the third functional module comprises an acoustic component, a sound guide channel is disposed in the housing, the second functional module and the first functional module are mounted on the housing, with an assembly gap present between the second functional module and the first functional module, and the acoustic component communicates with the assembly gap through the sound guide channel,
wherein the sound guide channel comprises a first sound guide segment, a second sound guide segment, and a third sound guide segment that are in sequential communication, the first sound guide segment communicates with the assembly gap, the acoustic component is located on an end of the third sound guide segment facing away from the second sound guide segment, a central axis of the first sound guide segment intersects with a central axis of the second sound guide segment, and the central axis of the first sound guide segment is parallel to a central axis of the third sound guide segment,
wherein the electronic device further comprises a main board bracket and a cover plate, both the main board bracket and the cover plate are located in the housing, a first groove is provided on a side of the main board bracket facing toward the first functional module, the cover plate covers a notch of the first groove, the cover plate and the first groove form the second sound guide segment, one end of the cover plate is provided with a first through hole, the second sound guide segment communicates with the first sound guide segment through the first through hole, the third sound guide segment is provided on a bottom wall of the first groove, and the first through hole and the third sound guide segment are staggered.

2. The electronic device according to claim 1, wherein the assembly gap is of an arc structure.

3. The electronic device according to claim 1, wherein an opening is provided on an edge of a side of the second functional module attached to the first functional module, or an opening is provided on an edge of a side of the first functional module attached to the second functional module; and the opening forms the assembly gap.

4. The electronic device according to claim 1, wherein the first functional module comprises a first functional component and a module bracket, the first functional component is mounted on the module bracket, the first functional component and the module bracket are exposed out of an outer surface of the housing, and the assembly gap is formed between the module bracket and the second functional module.

5. The electronic device according to claim 1, wherein a connection channel is formed between the first functional module and the second functional module, the first sound guide segment and the assembly gap are staggered, and the first sound guide segment communicates with the assembly gap through the connection channel.

6. The electronic device according to claim 1, wherein the electronic device further comprises a circuit board, the circuit board is disposed on a side of the main board bracket facing away from the first functional module, the circuit board is provided with a second through hole, the acoustic component is disposed on a side of the circuit board facing away from the main board bracket, and the acoustic component communicates with the third sound guide segment through the second through hole.

7. The electronic device according to claim 6, further comprising a second sealing member, wherein a third groove is provided on the side of the main board bracket facing away from the first functional module, the second sealing member is disposed in the third groove, the circuit board is sealedly connected to the main board bracket through the second sealing member, a second bypass hole is provided on a part of the second sealing member opposite the second through hole, and the third sound guide segment communicates with the second through hole through the second bypass hole.

8. The electronic device according to claim 6, wherein the electronic device further comprises a dustproof portion, and the dustproof portion is disposed between the third sound guide segment and the second through hole.

9. The electronic device according to claim 1, wherein the first functional module is of a disc structure, the second functional module is of a ring structure, the second functional module is disposed around the first functional module, the assembly gap is of an annular structure, and at least part of the assembly gap communicates with the sound guide channel.

10. An electronic device, comprising a housing, a first functional module, a second functional module, and a third functional module, wherein the third functional module is disposed in the housing, the third functional module comprises an acoustic component, a sound guide channel is disposed in the housing, the second functional module and the first functional module are mounted on the housing, with an assembly gap present between the second functional module and the first functional module, and the acoustic component communicates with the assembly gap through the sound guide channel,
wherein the sound guide channel comprises a first sound guide segment, a second sound guide segment, and a third sound guide segment that are in sequential communication, the first sound guide segment communicates with the assembly gap, the acoustic component is located on an end of the third sound guide segment facing away from the second sound guide segment, a central axis of the first sound guide segment intersects with a central axis of the second sound guide segment, and the central axis of the first sound guide segment is parallel to a central axis of the third sound guide segment, wherein the electronic device further comprises a main board bracket and a cover plate, both the main board bracket and the cover plate are located in the housing, a first groove is provided on a side of the main board bracket facing toward the first functional module, the cover plate covers a notch of the first groove, the cover plate and the first groove form the second sound guide segment, one end of the cover plate is provided with a first through hole, the second sound guide segment communicates with the first sound guide segment through the first through hole, the third sound guide segment is provided on a bottom wall of the first groove, and the first through hole and the third sound guide segment are staggered, wherein the electronic device further comprises a first sealing member, wherein the first functional module is sealedly connected to the cover plate through the first sealing member, a first bypass hole is provided on a part of the first sealing member opposite the first through hole, and the first sound guide segment and the second sound guide segment communicate with the first through hole through the first bypass hole.

11. The electronic device according to claim 10, wherein the assembly gap is of an arc structure.

12. The electronic device according to claim 10, wherein an opening is provided on an edge of a side of the second functional module attached to the first functional module, or an opening is provided on an edge of a side of the first functional module attached to the second functional module; and the opening forms the assembly gap.

13. The electronic device according to claim 10, wherein the first functional module comprises a first functional component and a module bracket, the first functional component is mounted on the module bracket, the first functional component and the module bracket are exposed out of an outer surface of the housing, and the assembly gap is formed between the module bracket and the second functional module.

14. The electronic device according to claim 10, wherein a connection channel is formed between the first functional module and the second functional module, the first sound guide segment and the assembly gap are staggered, and the first sound guide segment communicates with the assembly gap through the connection channel.

15. The electronic device according to claim 10, wherein the electronic device further comprises a circuit board, the circuit board is disposed on a side of the main board bracket facing away from the first functional module, the circuit board is provided with a second through hole, the acoustic component is disposed on a side of the circuit board facing away from the main board bracket, and the acoustic component communicates with the third sound guide segment through the second through hole.

16. The electronic device according to claim 15, further comprising a second sealing member, wherein a third groove is provided on the side of the main board bracket facing away from the first functional module, the second sealing member is disposed in the third groove, the circuit board is sealedly connected to the main board bracket through the second sealing member, a second bypass hole is provided on a part of the second sealing member opposite the second through hole, and the third sound guide segment communicates with the second through hole through the second bypass hole.

17. The electronic device according to claim 15, wherein the electronic device further comprises a dustproof portion, and the dustproof portion is disposed between the third sound guide segment and the second through hole.

18. The electronic device according to claim 10, wherein the first functional module is of a disc structure, the second functional module is of a ring structure, the second functional module is disposed around the first functional module, the assembly gap is of an annular structure, and at least part of the assembly gap communicates with the sound guide channel.

19. An electronic device, comprising a housing, a first functional module, a second functional module, and a third functional module, wherein the third functional module is disposed in the housing, the third functional module comprises an acoustic component, a sound guide channel is disposed in the housing, the second functional module and the first functional module are mounted on the housing, with an assembly gap present between the second functional module and the first functional module, and the acoustic component communicates with the assembly gap through the sound guide channel, wherein the sound guide channel comprises a first sound guide segment, a second sound guide segment, and a third sound guide segment that are in sequential communication, the first sound guide segment communicates with the assembly gap, the acoustic component is located on an end of the third sound guide segment facing away from the second sound guide segment, a central axis of the first sound guide segment intersects with a central axis of the second sound guide segment, and the central axis of the first sound guide segment is parallel to a central axis of the third sound guide segment, wherein the electronic device further comprises a main board bracket and a cover plate, both the main board bracket and the cover plate are located in the housing, a first groove is provided on a side of the main board bracket facing toward the first functional module, the cover plate covers a notch of the first groove, the cover plate and the first groove form the second sound guide segment, one end of the cover plate is provided with a first through hole, the second sound guide segment communicates with the first sound guide segment through the first through hole, the third sound guide segment is provided on a bottom wall of the first groove, and the first through hole and the third sound guide segment are staggered, wherein a second groove is further provided on the side of the main board bracket facing toward the first functional module, the first groove is provided at the bottom of the second groove, the first groove and the second groove form a sinking platform structure, and at least part of the cover plate is located in the second groove.

20. The electronic device according to claim 19, wherein the assembly gap is of an arc structure.

* * * * *